(12) United States Patent
Bajza et al.

(10) Patent No.: US 7,347,883 B2
(45) Date of Patent: Mar. 25, 2008

(54) HIGH FLOW AIR FILTRATION SYSTEM FOR FORD TRUCK

(75) Inventors: Eric Charles Bajza, Garden Grove, CA (US); Shahriar Nick Niakan, Anaheim Hills, CA (US); Saul Daniel Zambrano, Quartz Hill, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 539 days.

(21) Appl. No.: 11/088,526

(22) Filed: Mar. 24, 2005

(65) Prior Publication Data

US 2005/0210843 A1    Sep. 29, 2005

Related U.S. Application Data

(60) Provisional application No. 60/634,044, filed on Dec. 7, 2004, provisional application No. 60/556,171, filed on Mar. 24, 2004.

(51) Int. Cl.
*B01D 50/00* (2006.01)
(52) U.S. Cl. .................. 55/385.3; 123/198 E
(58) Field of Classification Search ............. 55/385.3; 123/198 E
See application file for complete search history.

(56) References Cited

U.S. PATENT DOCUMENTS

| 4,440,555 | A |   | 4/1984  | Chichester |
| 4,813,385 | A |   | 3/1989  | Yamaguchi et al. |
| 4,976,327 | A | * | 12/1990 | Abujudom et al. ........ 180/68.2 |
| 5,031,712 | A |   | 7/1991  | Karolek et al. |
| 5,542,489 | A |   | 8/1996  | Allison et al. |
| 5,739,675 | A |   | 4/1998  | Green et al. |
| 6,152,096 | A |   | 11/2000 | Setsuda |
| 6,162,271 | A | * | 12/2000 | Bullinger et al. .......... 55/385.3 |
| 6,178,939 | B1 | * | 1/2001 | Powell ................. 123/184.21 |
| 6,230,833 | B1 |   | 5/2001 | Setsuda |
| 6,258,144 | B1 | * | 7/2001 | Huang ........................ 55/385.3 |
| 6,287,354 | B1 | * | 9/2001 | Nozaki ....................... 55/385.3 |
| 6,364,921 | B1 |   | 4/2002 | Raether et al. |
| 6,485,544 | B1 |   | 11/2002 | Ziske |
| 6,632,271 | B2 |   | 10/2003 | Robertson et al. |

(Continued)

FOREIGN PATENT DOCUMENTS

EP    348618    12/1992

OTHER PUBLICATIONS

Ford stock air filter and battery arrangement for 7.2 liter truck—shown at Tabs A-C of Mr. Bajza's declaration.

(Continued)

*Primary Examiner*—Duane Smith
*Assistant Examiner*—Robert A Clemente
(74) *Attorney, Agent, or Firm*—Harold L. Jackson (57) ABSTRACT

An apparatus for filtering air includes a filter housing and a battery tray integral with the filter housing. The battery tray may be coupled to the filter housing via a ramp. The filter housing may comprise a first wall, a second wall, and a third wall, wherein the third wall is diagonally disposed between the first and second walls. The apparatus may further include an air intake tube having an upstream portion affixed to the third wall, and a downstream portion configured for fluid communication with a turbocharger of a V8 Ford diesel truck. Methods for providing filtered air to a turbo-diesel internal combustion engine are also disclosed.

14 Claims, 8 Drawing Sheets

U.S. PATENT DOCUMENTS

| | | |
|---|---|---|
| 6,705,272 B2 | 3/2004 | Leipelt et al. |
| 6,811,588 B2 | 11/2004 | Niakin |
| 6,860,267 B2 | 3/2005 | Capon et al. |
| 6,892,713 B2 * | 5/2005 | Criddle et al. ........... 123/559.1 |
| 6,902,598 B2 | 6/2005 | Gunderson et al. |
| 6,920,867 B2 * | 7/2005 | Cutts et al. .............. 123/559.1 |
| 6,938,614 B2 * | 9/2005 | Criddle et al. ........... 123/559.1 |
| 7,093,589 B2 | 8/2006 | Sorersen et al. |
| 7,122,068 B2 * | 10/2006 | Tate et al. .................... 55/497 |
| 2003/0080271 A1 | 5/2003 | Haves |
| 2004/0094115 A1 | 5/2004 | Jatzke et al. |
| 2005/0208348 A1 | 9/2005 | Canepa |
| 2005/0210843 A1 | 9/2005 | Bajza et al. |
| 2005/0217625 A1 | 10/2005 | Niaken et al. |

OTHER PUBLICATIONS

Advanced Flow Engineering's first generation system of a replacement filter for the Ford truck—shown at Tab D of Bajza's declaration.

\* cited by examiner

HIGH FLOW AIR FILTRATION SYSTEM FOR FORD TRUCK

CROSS-REFERENCE TO RELATED APPLICATIONS

This application claims the benefit of U.S. Provisional Patent Application No. 60/634,044, filed on Dec. 7, 2004 and U.S. Provisional Patent Application No. 60/556,171, filed on Mar. 24, 2004.

BACKGROUND OF THE INVENTION

This invention relates to air filtration systems for motorized vehicles, and in particular, to high performance air filtration systems for use with vehicles, such as Ford F-Series trucks having a V8, 7.3 L turbo-diesel engine.

The function of an air intake filter is to remove particulate matter from the intake air, so that clean air is provided to the engine. The intake air stream flows from the influent, or "dirty," side of the filter to the effluent, or "clean," side of the filter, with the air filter extracting the unwanted particles via one or more filter media layers. Filter media are selected to trap particles exceeding a particular size, while remaining substantially permeable to airflow over an expected filter lifetime.

The features and filter design choices that lead to improvements in one of these parameters (e.g., particle entrapment, airflow permeability, and filter lifetime) can lead to declines in the other performance parameters. Thus, filter design involves trade-offs among features achieving high filter efficiency, and features achieving a high filter capacity and concomitant long filter lifetime.

As used herein, filter efficiency is the propensity of the filter media to trap, rather than pass, particulates. Filter capacity is typically defined according to a selected limiting pressure differential across the filter, typically resulting from loading by trapped particulates. Volumetric filter flow rate, or flow rate, is a measure of the volume of air that can be drawn into a given filter having a particular effective filter area, efficiency, and capacity, at a particular point in the expected filter lifetime.

The choice of filter media having a high filter efficiency (wherein the filter media removes a high percentage of the particulate material in the intake air) is important, because any particulate matter passing through the filter may damage the engine. For filtration systems of equal efficiency, a longer filter lifetime typically is directly associated with higher capacity, because the more efficiently the filter medium removes particles from an air stream, the more rapidly that filter medium approaches the pressure differential indicating the end of the filter medium life. To extend filter lifetime, filter media can be pleated to provide greater filtering surface area.

The choice of air filter media that is permeable to airflow is important because the interposition of the filter into the engine intake air stream can impede the airflow rate. Decreased airflow rate tends to decrease engine efficiency, horsepower, torque, and fuel economy. Increased airflow rate through a vehicle's air filtration system, and/or the passage of cooler air therethrough, may improve engine performance. In applications demanding large volumes of filtered air, the ability to manipulate parameters such as air filter size, pleat depth, or both, is often constrained additionally by the physical environment in which the filter is operated (e.g., the space available for a filter of a given configuration within the engine compartment of a vehicle).

Some prior art air filters have been designed to provide increased filter flow rate. However, such designs may foster air turbulence at the filter inlet, which is an undesirable quality which may ultimately impair airflow. Also, some existing filter designs employ abrupt topological transitions, such as a one-step ring, a ledge, an edge, or a peak, which tend to encourage the development of air eddies and to reduce airflow into the filter. When air eddies cause influent air to bypass regions of the filter media near these abrupt transitions, the effective area of the filter available for filtration is reduced.

Prior art filters using pleated media often secure one or both ends of the pleated media to a filter housing in such a manner that the pleats are forced together, such that air cannot flow between adjacent pleats. In this situation, the effective area of a pleated filter media available for filtration is reduced.

As can be seen, there is a need for an improved air filtration system for an internal combustion engine for achieving high efficiency filtration of intake air. Furthermore, there is a need for an improved filtration apparatus for achieving high volumetric airflow rate and maximum effective area available for filtration.

SUMMARY OF THE INVENTION

In one aspect of the present invention, an air filtration system comprises a filter housing for accommodating a filter element, the filter element adapted for removing particulate matter from ambient air; and a battery tray integral with the filter housing, wherein the battery tray is adapted for receiving an automotive battery.

In another aspect of the present invention, an air filtration system comprises a filter housing; and a filter element disposed within the filter housing, wherein the filter housing includes a first wall, a second wall substantially orthogonal to the first wall, and a third wall disposed diagonally between the first wall and the second wall.

In a further aspect of the present invention, there is provided an apparatus comprising a filter housing including a housing floor; a filter element disposed within the filter housing, wherein the filter element is disposed above the housing floor; an air intake tube in fluid communication with the filter element; and a battery tray integral with the filter housing, wherein the battery tray is coupled to the housing floor via a ramp. The air intake tube is affixed to, and extends through, the filter housing; and a downstream portion of the air intake tube is adapted for coupling to a turbocharger of an internal combustion engine.

In still a further aspect of the present invention, an apparatus comprises a filter housing including a housing floor; a filter element disposed within the filter housing, wherein the filter element is disposed above the housing floor; an air intake tube in fluid communication with the filter element; and a battery tray integral with the filter housing; wherein the battery tray is coupled to the housing floor via a ramp. The air intake tube is affixed to, and extends through, the filter housing. The filter element is in fluid communication with the air intake tube; and a downstream portion of the air intake tube is adapted for coupling to a turbocharger of an internal combustion engine.

In yet a further aspect of the present invention, a method for providing filtered air to an internal combustion engine of a vehicle comprises filtering ambient air through a filter element of an air filtration system to provide the filtered air, wherein the air filtration system is installed in an engine compartment of the vehicle; supporting the filter element and a battery by a filter housing of the air filtration system; shielding the filter element and the ambient air from heat of the engine compartment; and passing the filtered air to the internal combustion engine.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an air filtration system and methods for delivering filtered air to the intake of an internal combustion engine of a vehicle, such as a turbo-diesel engine of a 1999 to 2003 7.3 Liter Ford diesel pickup truck.

An embodiment of the present invention may be distinguished from the prior art in having, inter alia, a filter housing which may include first and second walls, and a third wall diagonally disposed between the first and second walls. The present invention may be further distinguished from the prior art in having an air intake tube affixed to, and extending through, the third wall. The present invention may be still further distinguished from the prior art in having a battery tray integral with the filter housing, wherein the battery tray is coupled to a floor of the housing by a ramp, wherein the ramp may slope upwards from the battery tray to the housing floor. The present invention may be yet further distinguished from the prior art as an aftermarket air filtration system in being configured and adapted for installation within a stock, or original equipment manufacturer (OEM), engine compartment of a Ford pickup truck having a 7.3 Liter V8 turbo-diesel engine.

Figure 1A:
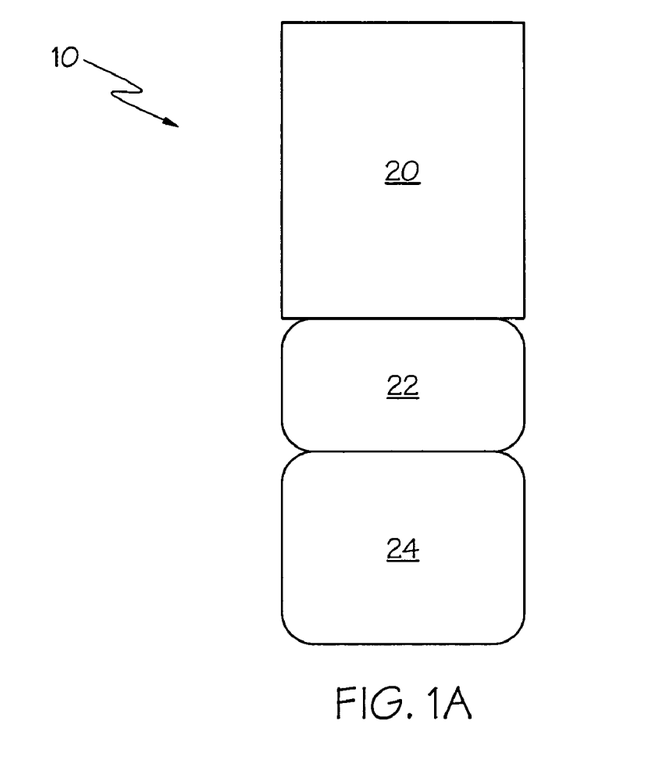
FIG. 1A is a plan view of an automotive vehicle, according to the present invention.

FIG. 1A is a schematic plan view of an automotive vehicle 10 including a bed 20, a cab 22 disposed forward of bed 22, and an engine compartment 24 disposed forward of cab 22. Engine compartment 24 may be open or may be covered by a hood (not shown).

Figure 1B:
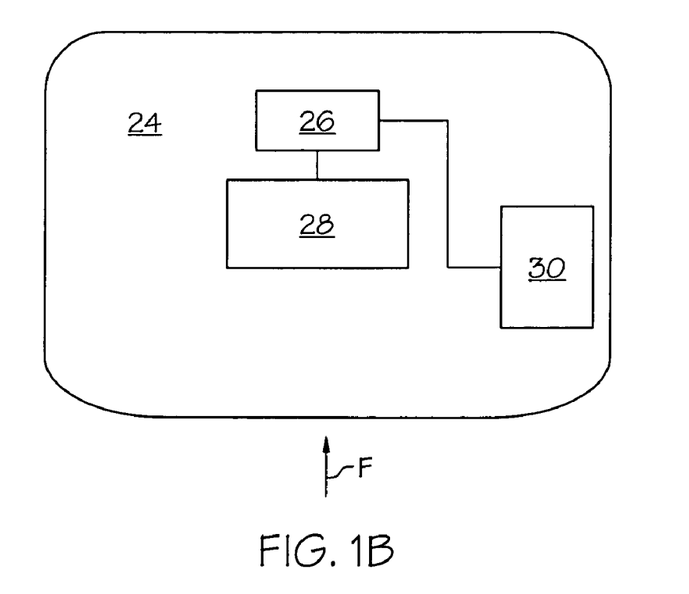
FIG. 1B is a plan view of an engine compartment of a vehicle, according to the present invention.

FIG. 1B is an enlarged schematic plan view of an engine compartment 24 of vehicle 10, according to the present invention. A front portion of engine compartment 24 is indicated in FIG. 1B by the arrow labeled F. Engine compartment 24 may accommodate a high flow air filtration system 30. As shown in FIG. 1B, air filtration system 30 may be located on the left of engine compartment 24, for example, adjacent to the left fender (not shown) of vehicle 10.

Air filtration system 30 may be in fluid communication with a turbocharger 26 of vehicle 10. Turbocharger 26 may be coupled to, and in fluid communication with, an internal combustion engine 28. Turbochargers for internal combustion engines are well known in the art. Internal combustion engine 28 may be a diesel engine. As an example, internal combustion engine 28 may be a stock, or OEM, engine for a truck, and turbocharger 26 may be an OEM turbocharger. In some embodiments of the present invention, internal combustion engine 28 may be a 7.3 L V8 turbo-diesel engine, and vehicle 10 may be a 1999 to 2003 model year Ford pickup truck.

With reference to FIGS. 2A-D, FIG. 2A is a plan view of an air filtration system 30, according to the present invention. Air filtration system 30 may include a filter housing 40, and an air intake tube 50 in fluid communication with turbocharger 26. Filter housing 40 may comprise, as an example, cold rolled steel, stainless steel, aluminum, or plastic. Air intake tube 50 may be a conduit for supplying filtered air to turbocharger 26. The airflow within air intake tube 50 may be in the direction indicated by the arrow labeled A. Air intake tube 50 may be affixed to filter housing 40 via a mounting flange 52. Mounting flange 52 may be integral with air intake tube 50. Mounting flange 52 may be bolted to third wall 46 of filter housing 40.

Figure 2A:
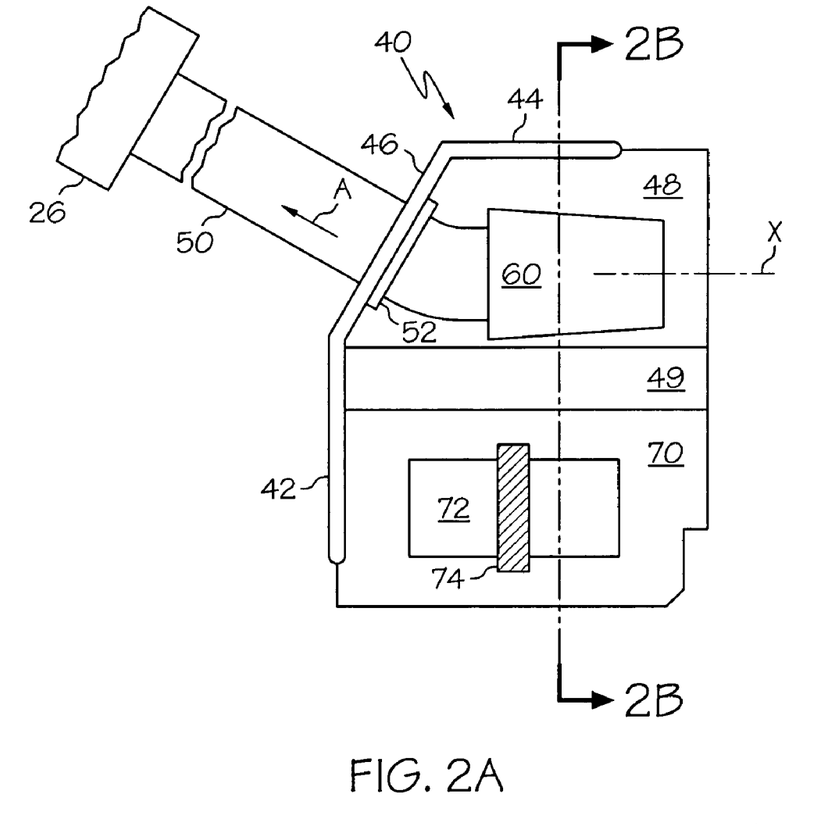
FIG. 2A is a plan view of an air filtration system, according to an embodiment of the present invention.

Air filtration system 30 may further include a filter element 60. Filter element 60 may be affixed to an upstream portion of air intake tube 50. Filter element 60 may have a long axis represented by the broken line labeled X. Filter element 60 may be generally or substantially frustoconical in shape, for example, filter element 60 may resemble a portion of a cone. Filter element 60 may be adapted for filtering ambient air, and for providing an adequate volume, or flow rate, of filtered air to turbocharger 26 and internal combustion engine 28.

Figure 2B:
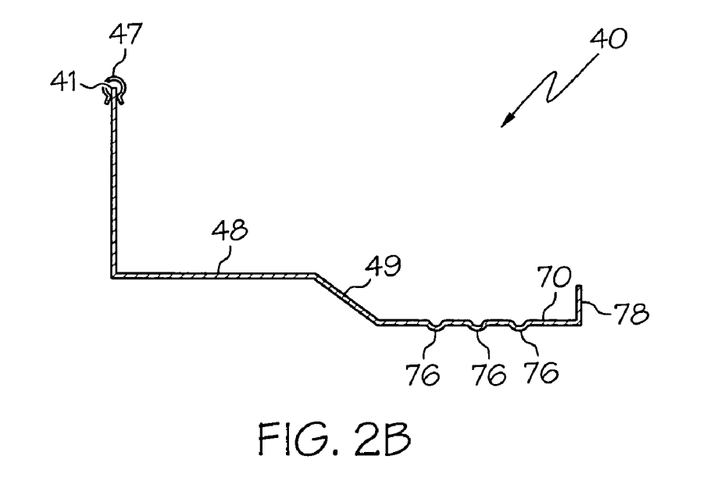
FIG. 2B is a sectional view of an air filter housing, as seen along the lines 2B-2B of FIG. 2A.
Figure 2C:
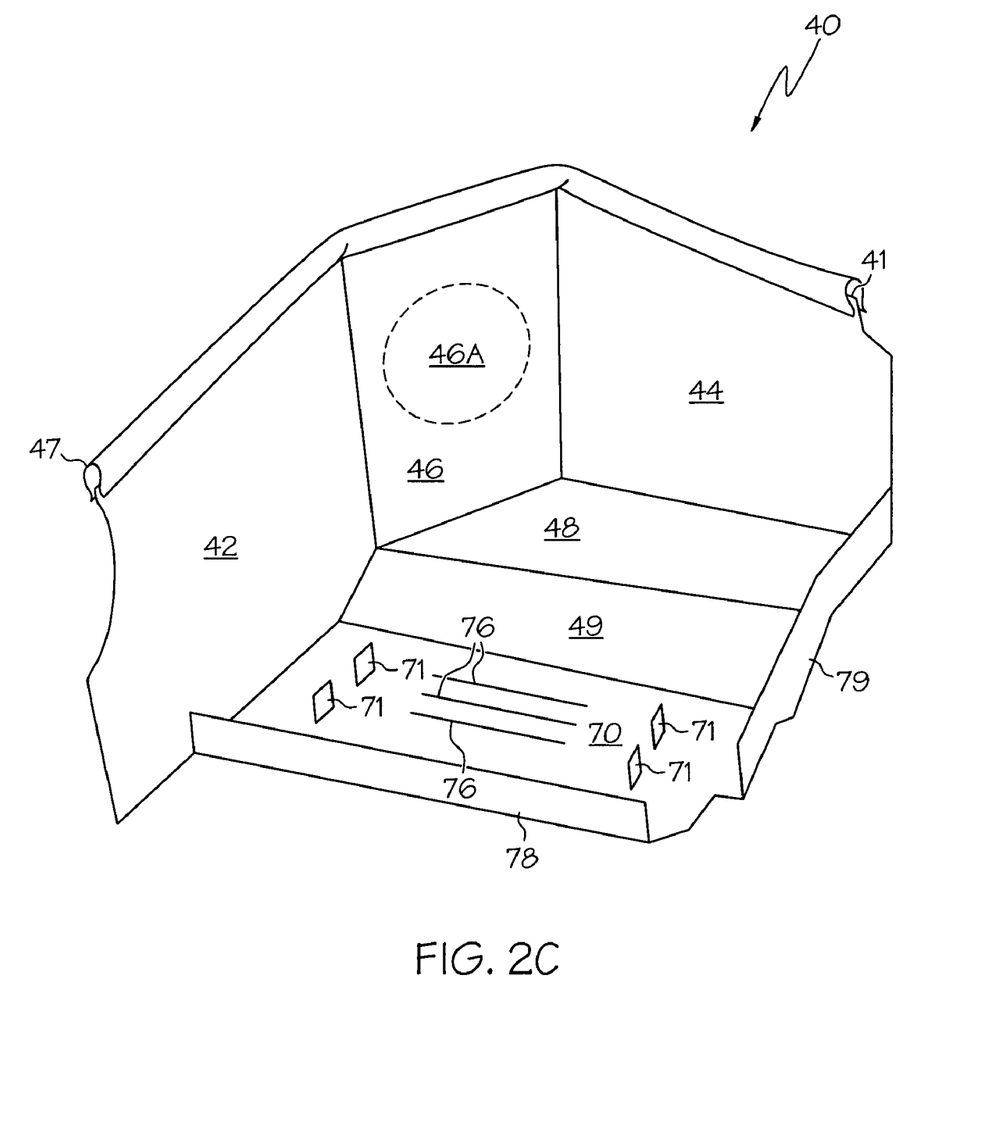
FIG. 2C is a perspective view of the air filter housing of the air filtration system of FIG. 2A.

With further reference to FIGS. 2A-C, filter housing 40 may include a first wall 42, a second wall 44, and a third wall 46. Each of first, second, and third walls 42, 44, and 46, respectively, may comprise a metal sheet. First wall 42 may be disposed orthogonally, or substantially orthogonally, to the longitudinal axis, X, of filter element 60. By substantially orthogonal is meant within a range of typically about +/−10° from the perpendicular. Second wall 44 may be disposed orthogonally, or substantially orthogonally, to first wall 42, and parallel, or substantially parallel, to the longitudinal axis, X of filter element 60. By substantially parallel is meant within a range of typically about +/−10° from parallel.

Third wall 46 may be contiguous with both first wall 42 and second wall 44. Third wall 46 may be disposed diagonally between first wall 42 and second wall 44. At least one of first wall 42, second wall 44, and third wall 46 may comprise, or function as, a heat shield, for example, to shield ambient air entering filter element 60 from engine-derived heat.

With further reference to FIG. 2C, third wall 46 may have therein an outlet port 46a. Outlet port 46a may be configured for receiving an upstream portion of air intake tube 50. An upstream portion 50a of air intake tube 50 may project from third wall 46 into filter housing 40.

Filter housing 40 may further include a housing floor 48 disposed beneath filter element 60, i.e., the filter element is positioned above the housing floor. The filter element and the filtration unit 66 included therein (to be described) is spaced from the battery 72 positioned on the tray 70 (FIG. 2A) so that air can circulate around the exterior of the filter and filtration unit as is illustrated in the drawings. Filter housing 40 may still further include an integral battery tray 70. Battery tray 70 may be coupled to housing floor 48 via a ramp 49. Filter housing 40 and battery tray 70 may be configured to fit within a left forward portion of an engine compartment 24 of a Ford pickup truck, such as a 7.3 Liter V8 turbo-diesel. Battery tray 70 may be adapted to accommodate an automotive battery 72, and filter housing 40 may include a battery bracket 74 for retaining battery 72 on a battery tray 70. Battery tray 70, housing floor 48, and ramp 49 may comprise a metal sheet.

With further reference to FIG. 2B, battery tray 70 may include a plurality of ribs 76. Ribs 76 may strengthen battery tray 70. Ribs 76 may be disposed longitudinally in battery tray 70, and substantially parallel to second wall 44.

With further reference to FIG. 2C, battery tray 70 may further include a plurality of tabs 71, which may project vertically from battery tray 70. Tabs 71 may serve for locating battery 72 on battery tray 70.

With still further reference to FIGS. 2B-C, filter housing 40 may further include an upper edge 41, which may extend along at least one of first wall 42, second wall 44, and third wall 46. Filter housing 40 may yet further include a trim seal 47 disposed at upper edge 41. Upper edge 41 may be configured such that trim seal 47 may contact an undersurface of a hood of vehicle 10, when the hood is in the closed position; and trim seal 47 may be adapted to seal upper edge 41 against the closed hood of vehicle 10.

Figure 2D:
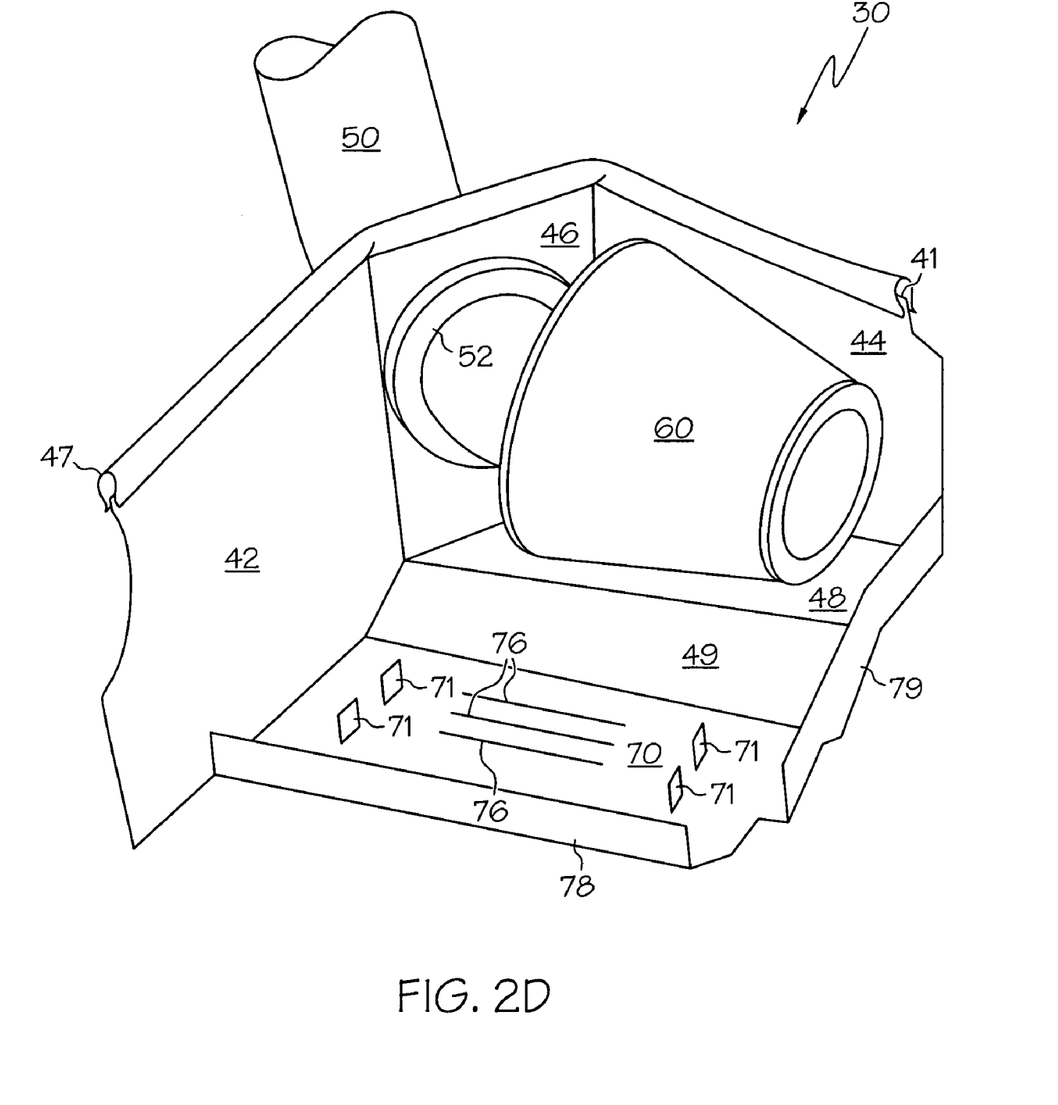
FIG. 2D is a perspective view of the air filtration system of FIG. 2A.

With further reference to FIGS. 2B-D, filter housing 40 may still further include a first rail 78, disposed at a side of battery tray 70 opposite ramp 49, and a second rail 79, disposed opposite first wall 42. Each of first rail 78 and second rail 79 may comprise a metal sheet. Filter housing 40 may be adapted for easy and convenient installation within engine compartment 24 of vehicle 10, for example, for facile installation in a location formerly occupied by OEM air filtration apparatus of a 1999 to 2003 model year turbo-diesel 7.3 Liter Ford pickup. As is illustrated in FIGS. 2B-D, a battery 72 mounted on the tray 70 is positioned within the housing 40 and shares the air space within the housing with the filter element 60.

With reference to FIGS. 3A-3E, FIG. 3A is a perspective view of a filter element 60 of the air filtration system 30 of FIG. 2A, as seen from the top of filter element 60. Filter element 60 may include a top sealing ring 62 at a top portion 63 of filter element 60, and a base sealing ring 64 at a base portion 65 of filter element 60. Top sealing ring 62 and top portion 63 may be circular or substantially circular. Filter element 60 may further include an outer filtration unit 66a disposed between top sealing ring 62 and base sealing ring 64. Each of top sealing ring 62 and base sealing ring 64 may comprise a synthetic resin, such as a polyurethane resin.

Figure 3A:
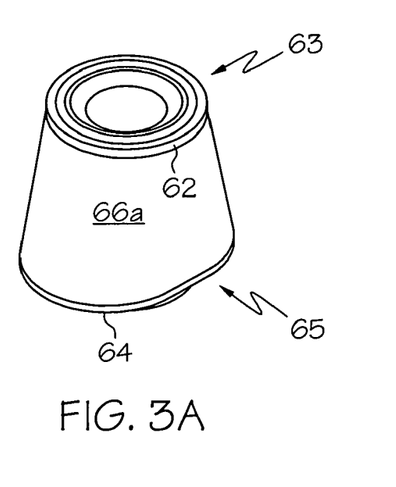
FIG. 3A is a perspective view of a filter element for an air filtration system, as seen from the top of the filter element, according to the present invention.
Figure 3B:
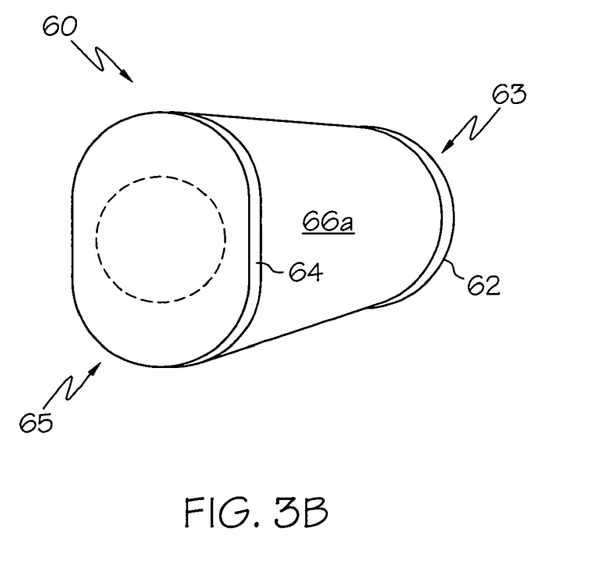
FIG. 3B is a perspective view of the filter element of FIG. 3A, as seen from the base of the filter element.
Figure 3C:
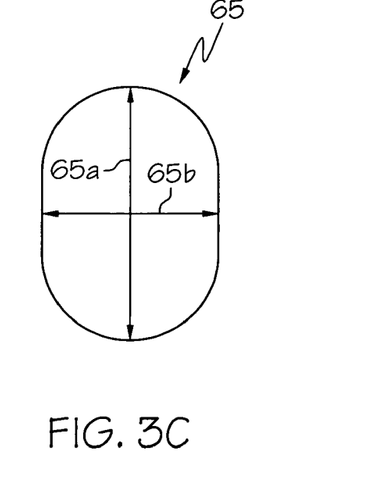
FIG. 3C is an end view of the base of the filter element of FIGS. 3A-B, showing a major axis and a minor axis.

FIG. 3B is a perspective view of filter element 60 as seen from base portion 65, and FIG. 3C is an end view of base portion 65. With reference to FIGS. 3B-C, base portion 65 may be oval, elliptical, or eccentric. Base portion 65 may have a major axis 65a and a minor axis 65b. Major axis 65a may be longer than minor axis 65b, such that a ratio of minor axis 65b to major axis 65a may be in the range of from about 0.60:1 to 0.85:1, typically from about 0.70:1 to 0.80:1, and often from about 0.70:1 to 0.75:1.

Figure 3D:
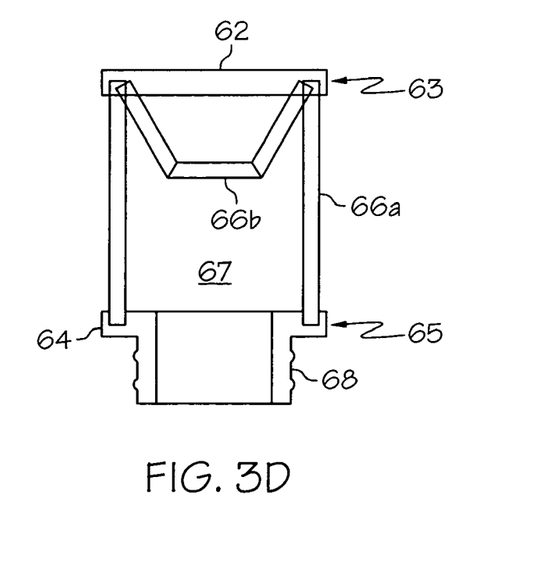
FIG. 3D is a longitudinal sectional view of the filter element of FIGS. 3A-C, taken along the minor axis of FIG. 3C.
Figure 3E:
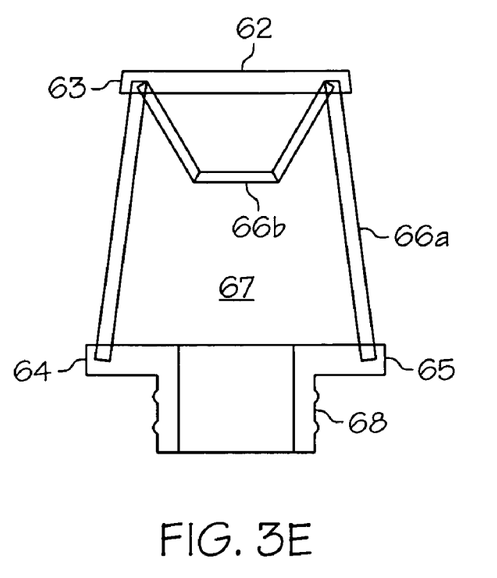
FIG. 3E is a longitudinal sectional view of the filter element of FIGS. 3A-C, taken along the major axis of FIG. 3C.

FIG. 3D is a longitudinal sectional view of filter element 60, taken along the minor axis 65b of FIG. 3C, and FIG. 3E is a longitudinal sectional view of the filter element of FIGS. 3A-C, taken along the major axis 65a of FIG. 3C. As can be seen in FIGS. 3D-E, outer filtration unit 66a may define an internal void 67 therein. Filter element 60 may further include an inner filtration unit 66b disposed within void 67. Inner filtration unit 66b may be configured as a portion of a cone, i.e., inner filtration unit 66b may be frustoconical or substantially frustoconical in configuration. Inner filtration unit 66b may be coupled to outer filtration unit 66a at top sealing ring 62.

Figure 5:
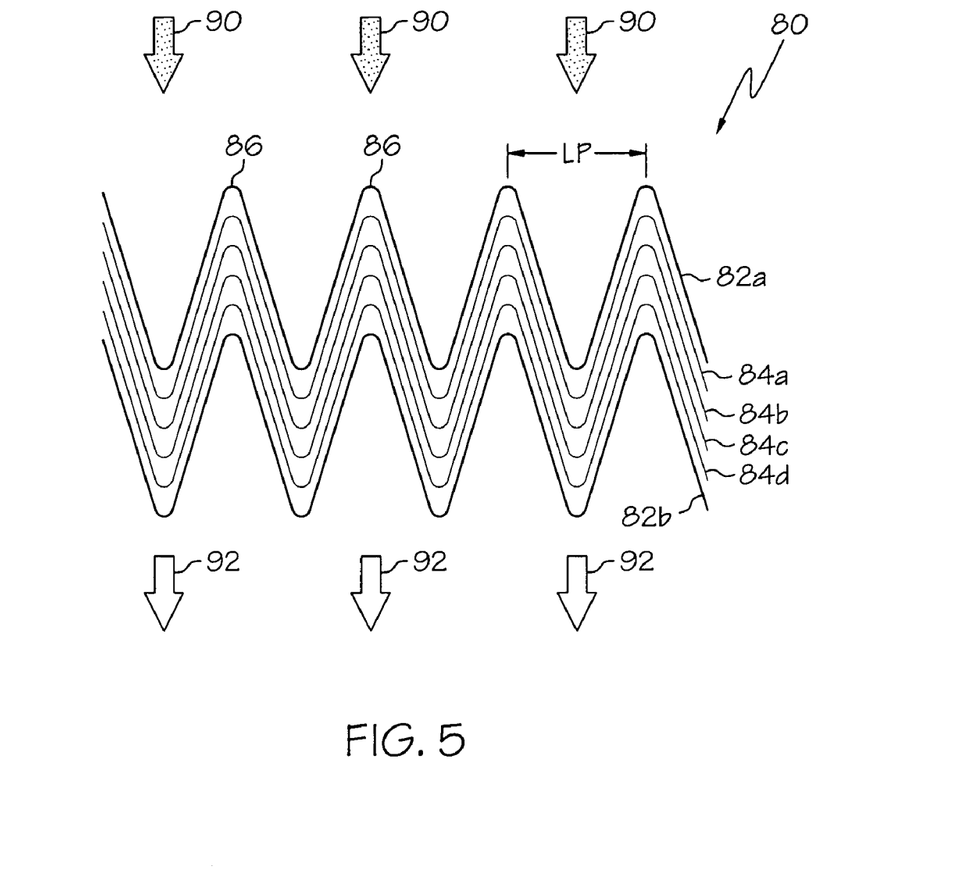
FIG. 5 is a sectional view of a filter medium for an air filtration system, according to an embodiment of the present invention.

Each of outer filtration unit 66a and inner filtration unit 66b may comprise a filter medium 80 (see, for example, FIG. 5). Filter element 60 may still further include a sleeve portion 68. Filter element 60 may be affixed to an upstream portion of air intake tube 50 via sleeve portion 68. Sleeve portion 68 may be adapted for receiving a hose-clamp (not shown). It is to be understood that configurations other than those depicted in FIGS. 3A-E are also within the scope of the present invention.

Figure 4:
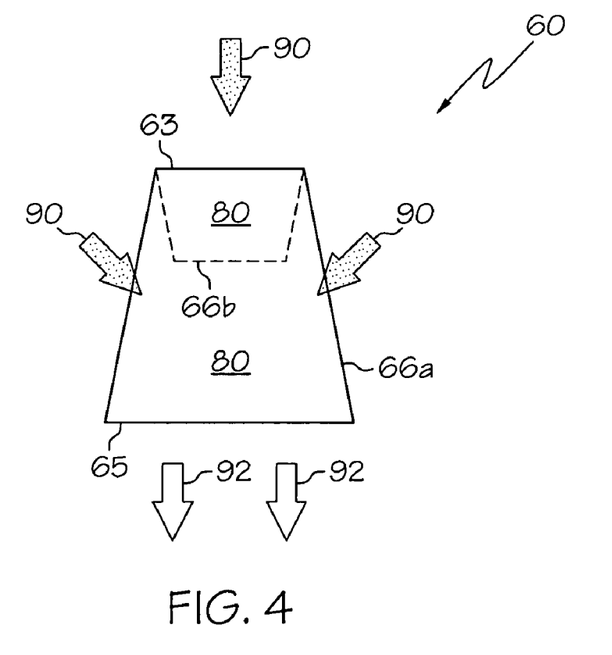
FIG. 4 is a longitudinal sectional view of a filter element having an inner filtration unit and an outer filtration unit, according to an embodiment of the present invention.

FIG. 4 is a longitudinal sectional view of a filter element 60 indicating the direction of flow of ambient or unfiltered air 90 (solid arrows) through both inner filtration unit 66b and outer filtration unit 66a to provide filtered air 92 (open arrows). As noted hereinabove with reference to FIGS. 3D-E, each of outer filtration unit 66a and inner filtration unit 66b may comprise a filter medium 80. Ambient unfiltered air 90 may be passed both laterally through outer filtration unit 66a, as well as substantially axially from top portion 63 through inner filtration unit 66b. Ambient unfiltered air 90 may have particulate matter, such as dust, grit, and the like, entrained within a stream thereof; in contrast, filtered air 92 may be devoid, or substantially devoid, of entrained particulate matter. An air filtration apparatus and filter media thereof were disclosed in commonly assigned co-pending U.S. patent application Ser. No. 11/011,833, filed on Dec. 14, 2004, the disclosure of which is incorporated by reference herein in its entirety.

FIG. 5 is a sectional view of a filter medium 80 for a filter element 60, according to an embodiment of the present invention, schematically representing filtration of ambient unfiltered air 90 through filter medium 80 to provide filtered air 92. Filter medium 80 may comprise an outer structural support layer 82a, an inner structural support layer 82b, and one or more fabric layers 84a-d. Each fabric layer 84a-d may comprise a natural or synthetic fabric. In some embodiments, filter medium 80 may comprise at least four fabric layers 84a-d of natural or synthetic material. Each fabric layer 84a-d may comprise, as non-limiting examples, a layer of cotton gauze or a layer of polyester fabric. It is to be understood that the invention is not limited to four fabric layers 84a-d, but rather other numbers of layers are within the scope of the invention. Filter medium 80 may be pleated to provide an inter-pleat distance, $L_p$ between adjacent pleats 86, such that air can readily flow between adjacent pleats 86. Filter media for an air filtration apparatus were disclosed in commonly assigned U.S. Pat. No. 6,811,588, the disclosure of which is incorporated by reference herein in its entirety.

Figure 6:
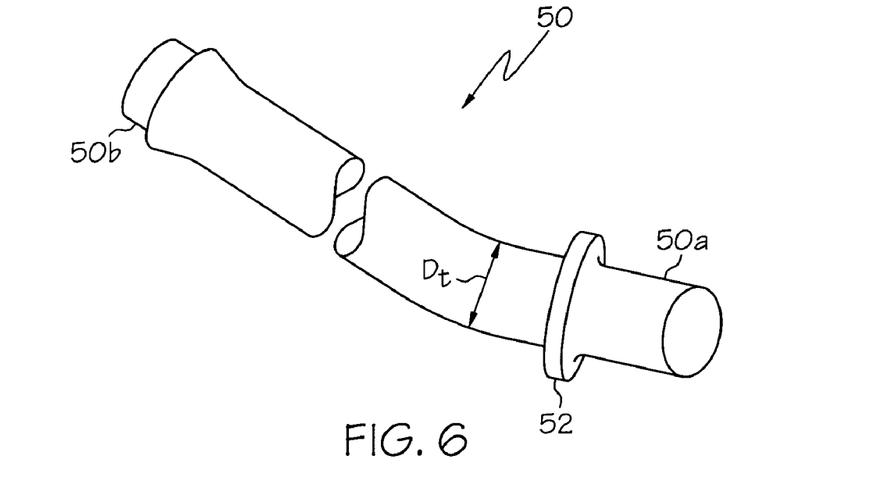
FIG. 6 is a perspective view schematically representing an air intake tube of an air filtration system, according to the present invention.

FIG. 6 is a perspective view schematically representing an air intake tube 50 of air filtration system 30, according to an embodiment of the present invention. Air intake tube 50 may include an upstream portion 50a, a downstream portion 50b, and an integral mounting flange 52 for affixing air outlet tube 50 to filter housing 40. Upstream portion 50a may be adapted for coupling to filter element 60, while downstream portion 50b may be adapted for coupling to turbocharger 26 or to a stock intake track (not shown) adjacent an inlet of turbocharger 26 (see, for example, FIGS. 2A and 2D). Air intake tube 50 may be configured or adapted for coupling between filter housing 40 and turbocharger 26 of a particular vehicle model, such as a turbo-diesel Ford pickup truck having a 7.3 Liter V8 engine. Air intake tube 50 may have a diameter, $D_t$ in the range of from about 4.5 to 6 inches, typically from about 5 to 6 inches, and often about 5.25 to 5.75 inches.

Figure 7:
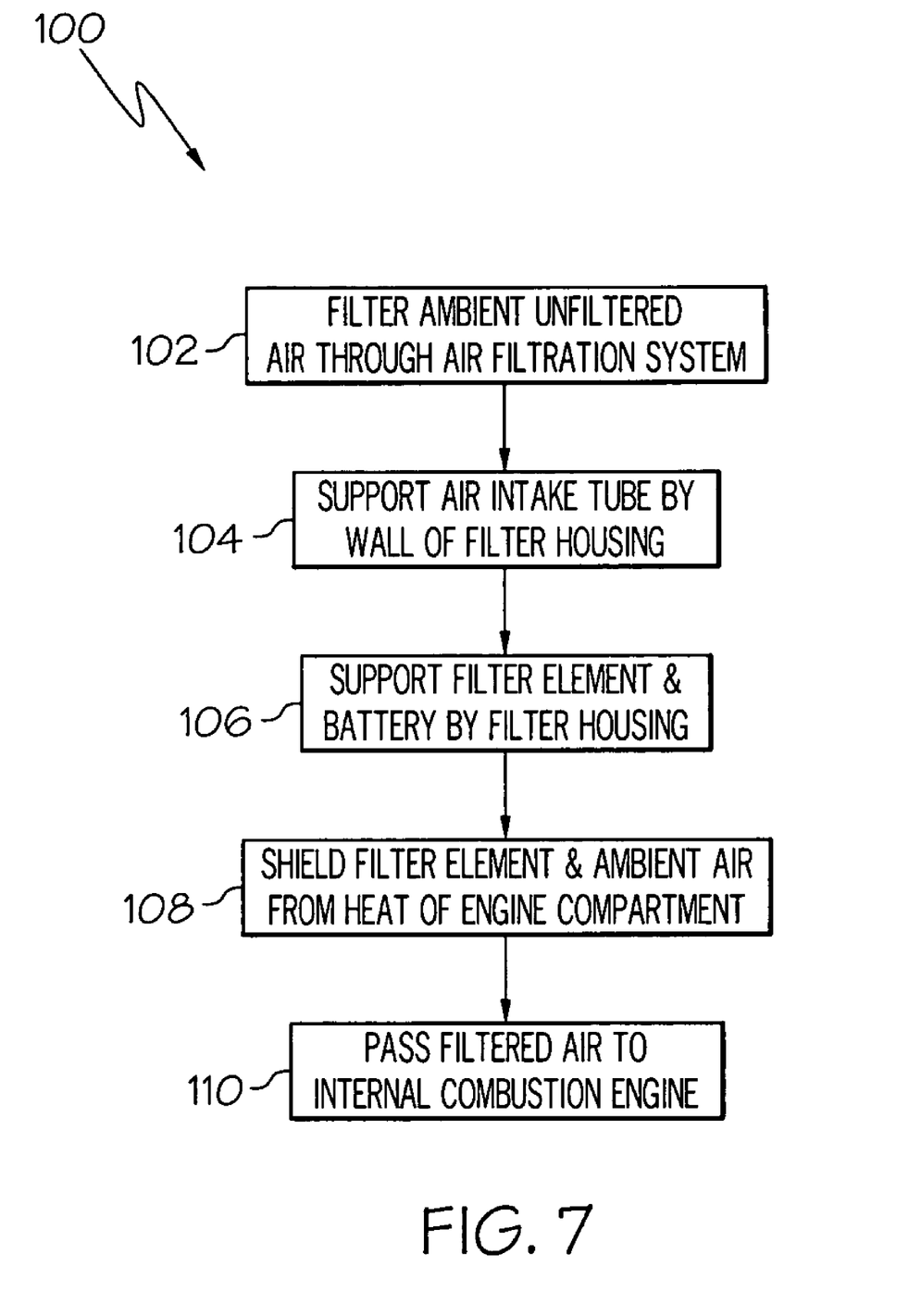
FIG. 7 schematically represents a series of steps involved in a method for providing filtered air to an internal combustion engine, according to another embodiment of the present invention.

FIG. 7 schematically represents a series of steps involved in a method 100 for providing filtered air to an internal combustion engine of a vehicle, according to another embodiment of the present invention, wherein step 102 may involve filtering ambient unfiltered air through an air filtration system, such as air filtration system 30. Particulate matter may be entrained within the ambient air, such as ambient air 90, and such particulate matter may be removed by passing the ambient air, such as ambient air 90 through a filter medium, such as filter medium 80 of a filter element, such as filter element 60 of the air filtration system, such as air filtration system 30. The filter element, such as filter element 60 may be in fluid communication with the ambient air, such as ambient air 90. The filter element, such as filter element 60 may be housed within a filter housing, such as filter housing 40 having an integral battery tray, such as battery tray 70. Step 104 may involve supporting an air outlet tube, such as air intake tube 50 via a third wall, such as third wall 46 of the filter housing. The air intake tube, such as air intake tube 50, may an integral mounting flange, such as mounting flange 52 for affixing the air outlet tube, such as air intake tube 50 to the filter housing, such as filter housing 40. An upstream portion of the air intake tube, such as upstream portion 50a of the air intake tube 50 may project through the third wall, such as third wall 46 of the filter housing, wherein the third wall may be diagonally disposed between a first wall, such as first wall 42 and a second wall, such as second wall 44 of the filter housing. Step 106 may involve supporting the filter element, such as filter element 60 and a battery, such as battery 72 via the filter housing. The filter element may be coupled to the upstream portion of the air intake tube. The battery, such as battery 72 may be supported by the integral battery tray, such as 70 of the filter housing. The function of the battery tray may be to support the battery, such as battery 72. Step 108 may involve shielding the filter element, such as filter element 60 from heat generated within the engine compartment, such as engine compartment 24 of the vehicle, such as vehicle 10. Step 108 may further involve shielding ambient air, such as ambient air 90 entering the filter element, such as filter element 60 from heat within the engine compartment of the vehicle, such as vehicle 10. The filter housing, such as filter housing 40 may act as a heat shield for shielding an interior of the filter housing 40 and the filter element 60 from engine-derived heat. The filter element 60 and ambient air, such as ambient air 90 may be shielded from heat by one or more portions of the filter housing 40, such as the first wall 42, second wall 44, third wall 46, and a housing floor 48. Accordingly, the air passing from the filter element, such as filter element 60 may have a temperature below about 170° F., usually below about 150° F., and often below about 120° F. Step 110 may involve passing filtered air, such as filtered air 92 from the filter element to the internal combustion engine 28. The filtered air 92 may be passed to the internal combustion engine 28 via a turbocharger, such as turbocharger 26 of the vehicle, such as vehicle 10.

Providing filtered air to the internal combustion engine according to embodiments of the present invention may improve engine performance, for example, by increasing horsepower, torque, and/or fuel economy.

It should be understood, of course, that the foregoing relates to exemplary embodiments of the invention and that modifications may be made without departing from the spirit and scope of the invention as set forth in the following claims.

We claim:

1. An aftermarket motor vehicle air filtration system including a battery tray for installation within a stock OEM engine compartment comprising:
   a) a filter housing having a plurality of contiguous walls extending upwardly from a floor to an upper edge with one of the walls defining an air outlet port;
   b) a battery tray formed integrally with the housing and extending along a longitudinal axis generally parallel to one of said walls so that a battery placed on the tray is positioned within the housing;
   c) an air intake tube secured to the housing and having an upstream end projecting through the air outlet port and a downstream end through which filtered air passes on route to an air intake of an internal combustion engine;
   d) a filter element having a base and top portion with the base portion connected to the upstream end of the air intake tube and a top portion; and
   e) the filter element extending upstream from the base portion alongside a battery positioned on the tray and above the floor to the top portion, the filter element sharing the common air space within the housing with the battery to allow for an increase in the volumetric filter flow rate over the flow rate achievable in the stock system.

2. The air filtration system of claim 1 wherein the filter base portion is elliptical in shape with a ratio of minor to major axis within the range of about 0.60:1 to 0.85 to 1.

3. The air filtration system of claim 1 wherein the filter element includes an air filtration unit disposed between the top and base portions of the filter element for accommodating the passage of unfiltered air through the filtration unit.

4. The air filtration system of claim 3 wherein the plurality of housing walls comprise three walls which terminate in an upper edge and further including a trim seal disposed on said upper edge.

5. The air filtration system of claim 4 wherein the walls comprise first, second and third walls with the first and second walls being substantially perpendicular to each other with the third wall extending diagonally between the first and second walls the third wall defining the air outlet port and wherein the longitudinal axis of the battery tray extends generally parallel to the second wall.

6. The air filtration system of claim 5 wherein the air filter element is arranged to accommodate lateral air flow through the air filtration unit.

7. A motor vehicle air filtration system and battery accommodating tray comprising:
   a) a filter housing having first, second and third walls extending upwardly from a floor, the third wall being disposed between the first and second walls, the third wall defining an air outlet port through which air may be supplied to the air intake of an internal combustion engine;
   b) a battery tray formed integrally with the housing with the tray extending along a longitudinal axis generally parallel to the second wall so that a battery placed on the tray is positioned within the housing;
   c) a filter element having a base portion coupled to the air outlet port;
   d) the filter element extending upstream from the base portion alongside a battery positioned on the tray to a top portion, the filter element including an air filtration unit disposed between the top and base portions for channeling air flowing between the top and base portions to the outlet port, the filter and battery sharing the same airspace within the housing; and
   e) the filter element being disposed above the housing floor and spaced from a battery positioned on the tray to allow air to circulate around the exterior of the filtration unit.

8. The air filtration system of claim 7 wherein the second wall is substantially orthogonal to the first wall and the third wall is disposed diagonally between the first and second walls.

9. The air filtration system of claim 8 wherein at least the first wall comprises a heat shield.

10. The air filtration system of claim 9 wherein the housing walls terminate in an upper edge and further including a trim seal disposed on said upper edge.

11. The air filtration system of claim 10 wherein an air intake tube is affixed to and extends through the third housing wall forming the air outlet port, with the base portion of the filter element being connected to the air intake tube.

12. An air filtration system, comprising:
   a) a filter housing for accommodating a filter element, said filter element adapted for removing particulate matter from ambient air, the filter housing including a first wall, a third wall contiguous with said first wall, and a second wall contiguous with said third wall, wherein said third wall is diagonally disposed between said first and second walls;
   b) a trim seal disposed on the upper edge of said filter housing, wherein said upper edge extends along said first, second and third walls;
   c) an air intake tube affixed to said filter housing, wherein an upstream portion of said air intake tube projects from said third wall into said filter housing;
   d) the air intake tube including an integral mounting flange for affixing said upstream portion of said air intake tube to said filter housing, the filter element being affixed to said upstream portion of said air intake tube, the first wall comprising a heat shield for shielding said filter element; and
   e) a battery tray integral with the filter housing.

13. The air filtration system of claim 12 wherein:
   said air intake tube includes a downstream portion; and
   said air intake tube is configured for coupling said downstream portion of said air intake tube to a turbocharger.

14. The air filtration system of claim 13 wherein said turbocharger is in fluid communication with an internal combustion engine.

* * * * *

(12) EX PARTE REEXAMINATION CERTIFICATE (7648th)
United States Patent
Bajza et al.

(10) Number: US 7,347,883 C1
(45) Certificate Issued: Jul. 27, 2010

(54) HIGH FLOW AIR FILTRATION SYSTEM FOR FORD TRUCK

(75) Inventors: Eric Charles Bajza, Garden Grove, CA (US); Shahriar Nick Niakan, Anaheim Hills, CA (US); Saul Daniel Zambrano, Quartz Hill, CA (US)

(73) Assignee: Advanced Flow Engineering, Inc., Corona, CA (US)

Reexamination Request:
No. 90/009,526, Jul. 13, 2009

Reexamination Certificate for:
Patent No.: 7,347,883
Issued: Mar. 25, 2008
Appl. No.: 11/088,526
Filed: Mar. 24, 2005

Related U.S. Application Data

(60) Provisional application No. 60/634,044, filed on Dec. 7, 2004, and provisional application No. 60/556,171, filed on Mar. 24, 2004.

(51) Int. Cl.
*B01D 50/00* (2006.01)

(52) U.S. Cl. .................................. 55/385.3; 123/98 E
(58) Field of Classification Search ......................... None
See application file for complete search history.

(56) References Cited

U.S. PATENT DOCUMENTS 6,938,614 B2 * 9/2005 Criddle et al. ........... 123/559.1

FOREIGN PATENT DOCUMENTS

WO    WO 01/39949    *   6/2001

OTHER PUBLICATIONS

Airmail flyer dated Apr. 17, 2003 and accompanying photo of parts of Airaid part 400–131.*
AFE Catalog, Nov. 2003.*
Airaid Boost! advertisement, Truckin', Apr. 2001, p. 111.*
Dealers advertisement, Truckin', Apr. 2001, p. 146.*
Volant advertisement, Truckin', Jan. 2002, p. 183.*
K&N advertisement, Truckin', Jul. 2002, p. 157.*
Airaid Dirty Little Secret advertisement, Truckin', Jul. 2002, p. 297.*
"Open Air Assistance," p. 172, Volant installation qt p. 174; Truckin', Aug. 2002.*

* cited by examiner

*Primary Examiner*—Terrence R Till (57) ABSTRACT

An apparatus for filtering air includes a filter housing and a battery tray integral with the filter housing. The battery tray may be coupled to the filter housing via a ramp. The filter housing may comprise a first wall, a second wall, and a third wall, wherein the third wall is diagonally disposed between the first and second walls. The apparatus may further include an air intake tube having an upstream portion affixed to the third wall, and a downstream portion configured for fluid communication with a turbocharger of a V8 Ford diesel truck. Methods for providing filtered air to a turbo-diesel internal combustion engine are also disclosed.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *